April 22, 1924.
L. M. BURGHART
PROCESS OF ALCOHOLYSIS
Filed April 5, 1921
1,491,076
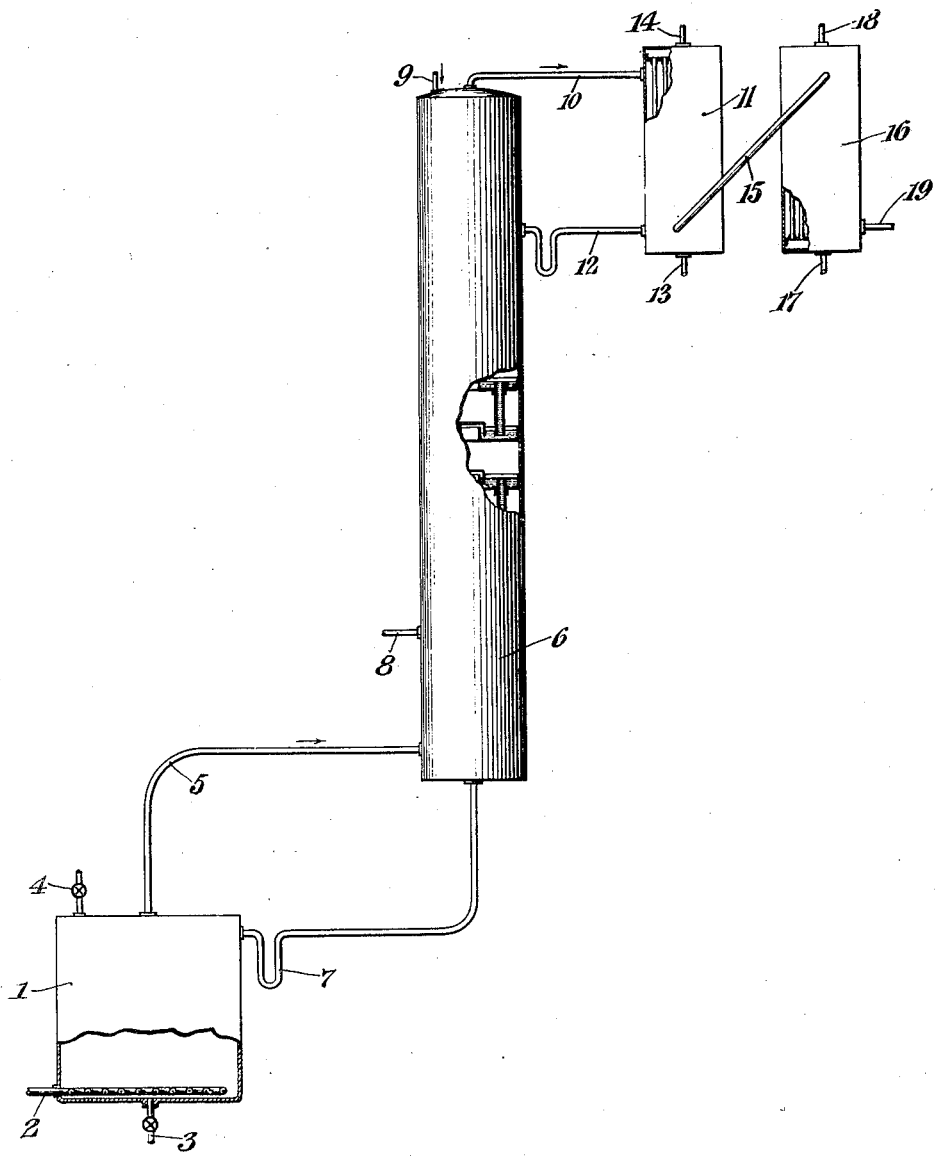

Patented Apr. 22, 1924.

1,491,076

UNITED STATES PATENT OFFICE.

LLOYD M. BURGHART, OF BALTIMORE, MARYLAND, ASSIGNOR TO U. S. INDUSTRIAL ALCOHOL CO., A CORPORATION OF WEST VIRGINIA.

PROCESS OF ALCOHOLYSIS.

Application filed April 5, 1921. Serial No. 458,847.

*To all whom it may concern:*

Be it known that I, LLOYD M. BURGHART, a citizen of the United States, residing at Baltimore, State of Maryland, have invented certain new and useful Improvements in Processes of Alcoholysis, of which the following is a specification.

My invention relates particularly to a process of alcoholysis, that is, a process in which an ester is treated with an alcohol in such a manner as to displace the basic radical of the ester, thus obtaining a new ester in which the basic radical of the ester treated is substituted by the corresponding radical of the alcohol.

The object of my invention is to provide a process whereby esters may be obtained from other esters by substituting the basic radical therein with the corresponding radical contained in an alcohol, the same being conducted so as to carry the reaction beyond the equilibrium point, thereby obtaining increased yields of the ester formed and thus enabling the products to be produced on a commercial scale. In order to accomplish this I provide a process in which one or more of the end products formed may be removed, preferably continuously, such, for example, as the alcohol obtained in the reaction. The alcohol may be removed in any desired way as, for example, in the form of a constant boiling mixture with another one of the other materials present. In order to accomplish this I prefer to use a higher alcohol than the alcohol formed in the reaction to enable the latter to be more readily removed.

Further objects of my invention will appear from the detailed description thereof contained hereinafter.

While my invention is capable of being carried out in various ways, to illustrate the invention, I shall describe only certain ways of conducting the same hereinafter, and while it is capable of being carried out with various types of apparatus I have shown only one type of apparatus for use therewith in the accompanying drawings, in which—

The figure is a diagrammatic representation of an apparatus which may be used in carrying out my invention.

In the drawings I have shown a pot still 1 heated by a steam coil 2 and having a valved draw-off pipe 3 at the bottom thereof. If it should be desired to operate the apparatus with a batch process I provide a valved inlet pipe 4 at the top of the still 1. Preferably, however, the process is operated continuously, and the materials used in the reaction in the continuous process are introduced at another part of the apparatus as hereinafter described. The vapors evolved from the still 1 pass out of the same by means of a pipe 5 to a rectifying column 6 which has a liquid sealed return pipe 7 for returning amyl acetate formed in the reaction to the still 1. The amyl acetate is formed by introducing three to four parts by weight of commercial methyl acetate, that is to say, containing by way of example, 85% of methyl acetate and 15% of methyl alcohol, into the column through an inlet pipe 8 near the bottom thereof, and one part by weight of amyl alcohol mixed with a quantity of strong sulfuric acid having a density of 66° Bé. amounting to from .3 to 5% by weight of the other materials present, through an inlet pipe 9 located at the top of the column 6. The vapors from the column pass out by a pipe 10 to a dephlegmator 11 having a liquid sealed return pipe 12 leading to the column. The dephlegmator 11 is cooled in the usual way with the aid of inlet and outlet pipes 13 and 14. Vapors from the dephlegmator pass through a pipe 15 to a condenser 16 cooled by a current of water, passing through inlet and outlet pipes 17 and 18. The condensate passes out through a pipe 19.

In the operation of my process, assuming the same to be continuous, the mixture of sulfuric acid and amyl alcohol is introduced at th top of the column 6 while the methyl acetate is introduced near the bottom thereof. Heat is applied to the materials which reach the still 1, so as to maintain the still at a boiling temperature. Amyl acetate is formed in the still 1 and in the column 6 and the vapors pass up through the pipe 5, into the column 6 and then through the dephlegmator 11 to the condenser 16, where the condensed constant boiling mixture containing 18% methyl alcohol and 82% methyl acetate is recovered. The methyl alcohol formed in the reaction is thus being continually removed and the reaction is therefore conducted beyond the equilibrium stage. In this way large yields of the amyl acetate are obtainable and the process rendered available for commercial use. In conducting the process an endeavor is made to remove as much of the alcohol as possible so as to carry the process as far as the nature of the materials used will permit. The removal during the reaction of the one or more of the end products formed in the reaction may be accomplished in any desired way, as, for example, by distillation, salting out, extraction, washing, precipitation with the addition of a third material, or by decomposition thereof. In the particular process described in detail above, however, the process is so arranged as to form an alcohol that boils at a lower point than the alcohol added to the reaction mixture so as to enable it to be readily removed by distillation.

Other esters than amyl acetate may be produced by the use of different reacting materials, such, for example, as methyl formate and amyl alcohol, methyl acetate and butyl alcohol. Also, other catalysts may be used instead of sulfuric acid, such as other mineral acids, for example, hydrochloric acid, also sodium alcoholate, sodium hydroxide or barium hydroxide, and where anhydrous esters are used metallic sodium may be the catalyst utilized.

While I have described my invention above in detail it is to be understood that various changes are possible therein without departing from the spirit of the invention.

I claim:

1. The process which comprises reacting upon an ester with an alcohol so as to form another ester and another alcohol and removing by distillation during the reaction a quantity of the alcohol formed so as to remove a constant boiling mixture of the alcohol and the ester added.

2. The process which comprises reacting upon an ester of an aliphatic acid and alcohol with an alcohol so as to form another ester and another alcohol, and removing by distillation during the reaction a quantity of the alcohol formed so as to remove a constant boiling mixture of the alcohol and the ester added.

3. The process which comprises reacting upon methyl acetate with another alcohol so as to form another acetate and methyl alcohol, and removing a quantity of the methyl alcohol formed by distillation so as to remove a constant boiling mixture of the methyl alcohol and the methyl acetate added.

4. The process which comprises reacting upon an ester with an alcohol so as to form another ester and another alcohol, the process being carried out continuously by the continuous addition of the ester and the alcohol added and continuously carrying the reaction beyond the point of equilibrium.

5. The process which comprises reacting upon an ester with an alcohol so as to form another ester and another alcohol and removing a quantity of one of the products formed, the process being carried out continuously by the continuous addition of the ester and the alcohol added and continuously carrying the reaction beyond the point of equilibrium.

6. The process which comprises reacting upon an ester with an alcohol so as to form another ester and another alcohol and removing a quantity of the alcohol formed, the process being carried out continuously by the continuous addition of the ester and the alcohol added and continuously carrying the reaction beyond the point of equilibrium.

7. The process which comprises reacting upon an ester with an alcohol so as to form another ester and another alcohol and removing a quantity of the alcohol formed by distillation, the process being carried out continuously by the continuous addition of the ester and the alcohol added and continuously carrying the reaction beyond the point of equilibrium.

8. The process which comprises reacting upon an ester with an alcohol so as to form another ester and another alcohol and removing a quantity of the alcohol formed by distillation so as to remove a constant boiling mixture of the alcohol and the ester added, the process being carried out continuously by the continuous addition of the ester and the alcohol added and continuously carrying the reaction beyond the point of equilibrium.

9. The process which comprises reacting upon methyl acetate with another alcohol so as to form another acetate and methyl alcohol and removing a quantity of the methyl alcohol formed by distillation so as to remove a constant boiling mixture of the methyl alcohol and the methyl acetate added, the process being carried out continuously by the continuous addition of the ester and the alcohol added, and continuously carrying the reaction beyond the point of equilibrium.

10. The process which comprises introducing amyl alcohol and sulphuric acid into the top of a column still, introducing methyl acetate in the bottom thereof, allowing the amyl acetate and other products to flow into a second still, heating the latter, and distilling off the methyl alcohol which is formed in the column still during the reaction.

In testimony that I claim the foregoing, I have hereunto set my hand this 26th day of January, 1921.

LLOYD M. BURGHART.